United States Patent
Courrieu

(10) Patent No.: US 7,322,228 B2
(45) Date of Patent: Jan. 29, 2008

(54) EVALUATING THE LEAKTIGHTNESS OF A DEVICE FOR STORING FUEL GAS UNDER HIGH PRESSURE

(75) Inventor: Olivier Courrieu, Paris (FR)

(73) Assignee: Gaz de France, Paris (FR)

( * ) Notice: Subject to any disclaimer, the term of this patent is extended or adjusted under 35 U.S.C. 154(b) by 0 days.

(21) Appl. No.: 11/453,523

(22) Filed: Jun. 15, 2006

(65) Prior Publication Data

US 2006/0283237 A1    Dec. 21, 2006

(30) Foreign Application Priority Data

Jun. 16, 2005    (FR) .................................. 05 06109

(51) Int. Cl.
G01M 3/28 (2006.01)
G01M 3/02 (2006.01)
G01M 3/30 (2006.01)

(52) U.S. Cl. .................. 73/49.2; 73/40; 73/40.5 R; 73/49.1; 73/49.3

(58) Field of Classification Search ............. 73/37–52; 48/194

See application file for complete search history.

(56) References Cited

U.S. PATENT DOCUMENTS

| | | | |
|---|---|---|---|
| 2,979,939 A | 4/1961 | Shuh | |
| 4,269,061 A | 5/1981 | Hatsuno et al. | |
| 4,449,392 A | 5/1984 | Huschke | |
| 5,866,802 A | 2/1999 | Kimata et al. | |
| 6,070,453 A * | 6/2000 | Myers | 73/40.5 R |
| 7,051,579 B2 * | 5/2006 | Kenney et al. | 73/49.2 |
| 7,107,820 B2 * | 9/2006 | Nunnally et al. | 73/40 |
| 2002/0100314 A1 * | 8/2002 | Docy et al. | 73/49.2 |
| 2004/0237630 A1 * | 12/2004 | Cook et al. | 73/40 |
| 2005/0126265 A1 * | 6/2005 | Herzog et al. | 73/49.2 |
| 2006/0090547 A1 * | 5/2006 | Hutchinson et al. | 73/49.2 |

FOREIGN PATENT DOCUMENTS

WO    WO 02/086437 A1    10/2002

* cited by examiner

*Primary Examiner*—Edward Lefkowitz
*Assistant Examiner*—Jonathan Dunlap
(74) *Attorney, Agent, or Firm*—Weingarten, Schurgin, Gagnebin & Lebovici LLP

(57) ABSTRACT

The system for evaluating leaktightness is applied to a gas storage device for storing high pressure fuel gas delivered from a filling station via a filler hose connected to the gas storage device, itself comprising pipework and at least one tank, together with at least one check valve disposed between the pipework and the tank. The system comprises a pressure-measuring device that is suitable for connection to the filler hose or to the pipework, a processor device for processing values measured by the pressure-measuring device, and a display device for displaying information supplied by the processor device. The device for processing values measured by the pressure-measuring device includes a device for controlling filling and for suspending filling of the fuel gas storage device from the filling station, a device for controlling the filling flowing rate, a clock, and a unit for comparing the measured pressure relative to predetermined thresholds $S_i$ during periods in which filling is suspended.

14 Claims, 4 Drawing Sheets

EVALUATING THE LEAKTIGHTNESS OF A DEVICE FOR STORING FUEL GAS UNDER HIGH PRESSURE

This application claims priority to French application No. 05 06109 filed Jun. 16, 2005.

1. Field of the Invention

The present invention relates to a method and a system for evaluating the leaktightness of a gas storage device for storing fuel gas under high pressure that is delivered from a filling station via a filler hose that is connected to the gas storage device, itself comprising pipework and at least one tank.

The invention also relates in particular to filling tanks of fuel natural gas and to leak testing on-board high-pressure systems in which the pressure may be about 200 bars, for example.

2. State of the Prior Art

Various systems are already known for leak testing tanks containing non-pressurized liquid fuel (such as, for example, diesel or gasoline).

Under such circumstances, the operation is performed on a vehicle under maintenance and requires certain elements to be previously disconnected and also requires a special connection element to be used in order to ensure a leaktight connection between the filler endpiece and a source of inert gas under pressure. After the tank has been pressurized together with the pipework upstream therefrom, variation of the pressure in the system is monitored, which makes it possible to detect a drop in pressure that is characteristic of a leak. Such leak testing systems are difficult to use in simple manner since it is necessary either for the tank to be emptied beforehand, or else for the volume of the empty space inside the tank that is not filled with liquid to be determined.

Proposals have also been made to leak test vehicles operating on natural gas for vehicles (NGV). Nevertheless, such diagnosis is performed when the vehicle is produced and involves pressurizing the gas storage system using an inert gas that is different from the fuel.

SUMMARY OF THE INVENTION

The present invention seeks to remedy the drawbacks of the prior art and to make it possible to evaluate the leaktightness of a high pressure fuel gas storage device in a manner that is simple and inexpensive, that does not require the use of a test gas different from the fuel gas, and that enables leak testing to be performed on a regular and systematic basis throughout the lifetime of the fuel gas storage device.

These objects are achieved by a method of evaluating the leaktightness of a device for storing fuel gas under high pressure for use as fuel by vehicles and delivered from a filling station via a filler hose that is connected to the gas storage device, itself comprising pipework and at least one tank, the method comprising the following steps:

a) while filling the fuel gas storage device from the filling station, pressurizing the filler hose, the pipework, and said tank from the filling station at a pressure that is greater than at least 5 bar, filling at a controlled filling flow rate $Q_i$, and measuring variation in pressure $P_i$; and b) at a first predetermined instant $t_i$ after the start of pressurizing, suspending the filling operation without depressurizing, continuing to measure variation in pressure $P_i$ to a second predetermined instant $t_j$, comparing the pressure $P_i$ relative to a predetermined threshold $S_i$, and if between the first and second predetermined instants $t_i$, $t_j$ the pressure decreases and drops below the predetermined threshold $S_i$, informing that a leak is present, whereas if between the first and second predetermined instants $t_i$, $t_j$ the pressure remains above the predetermined threshold $S_i$, restarting the filling operation and, at subsequent instants, including at the normal end of the filling operation, repeating verifications of variation in pressure relative to predetermined thresholds during, a predetermined duration after each suspension of the filling operation so as to detect, on each occasion, the presence of a leak, if any.

According to an advantageous characteristic, prior to connecting the fuel storage device to the filler hose of the filling station, the method comprises pressurizing the filler hose up to a predetermined pressure greater than at least 5 bar, suspending pressurization at an instant $t0_i$ when the predetermined pressure is reached, but without depressurizing, measuring variation in pressure until a second predetermined instant $t0_j$, comparing the instantaneous value $P_i$ of the pressure relative to a predetermined threshold $S0_i$, and if between the first and second predetermined instants $t0_i$ and $t0_j$, the pressure decreases and drops below the predetermined threshold $S0_i$, informing that the filling station or the filler hose presents a leak, whereas if between the first and second predetermined instants $t0_i$, $t0_j$ the pressure remains above the predetermined threshold $S0_i$, repeating the operation of pressurizing the filler hose up to a predetermined pressure greater than the previously-reached pressure, and repeating the operation of suspending pressurization and monitoring pressure variation relative to a predetermined threshold during a predetermined duration in order again to detect the presence of a leak, if any, with new operations of pressurization and suspension while monitoring pressure variation being performed until reaching a maximum operating pressure of the filling station.

During the first step of filling the fuel gas storage device from the filling station at a controlled filling rate $Q_i$, variation in the pressure $P_i$ is measured as a function of time, and if a slope discontinuity is detected, it is deduced that a leak exists from the pipework.

Under such circumstances, it is very simple to locate the leak.

In another aspect of the invention, in order to determine the size of the leak, in the event of a leak from the fuel gas storage device being detected, the filling operation is repeated with the controlled filling flow rate being adjusted by successive increments, while continuing to monitor variation in pressure, and if, after two successive increases in the controlled filling flow rate there is detected firstly a horizontal pause at stabilized pressure and secondly a sloping pause of increasing pressure, then the leak is categorized as being a small or medium leak, and the leakage rate is determined from the controlled filling rate that led to said horizontal pause at stabilized pressure.

When, in the event of a leak from the fuel gas storage device being detected, the filling operation is repeated with the controlled filling flow rate being adjusted by successive increments, while continuing to monitor variation in pressure, and if, regardless of the value of the filling rate, it is observed that the pressure does not stabilize and always increases, the leak is classified in the microleak category.

When, in the event of a leak from the fuel gas storage device being detected, the filling operation is repeated with the controlled filling flow rate being adjusted by successive increments, while continuing to monitor variation in pressure, and if, regardless of the value of the filling rate, it is found that the pressure does not increase, the leak is classified in the category of very large leaks.

In the event of a leak being detected from the fuel gas storage device, after identifying the category specifying the size of the leak, and verifying the presence of a check valve between the pipework and the tank, the speed at which pressure drops is analyzed and compared relative to a threshold value $S_v$ depending on the respective volumes of the pipework and of the tank, and the leak is identified as being either from the pipework if the pressure drop speed is greater than the threshold value $S_v$, or as being from the tank if the pressure drop speed is less than the threshold value $S_v$.

The method of the invention is particularly useful when applied to leak testing storage devices for natural gas used as fuel for vehicles.

The method makes it possible in simple manner on each operation of filling with fuel gas in a filling station, to undertake a general diagnosis of leaktightness while also making it possible in the event of a leak being discovered to categorize the size of the leak and also its location as being either from the tank or from the pipework that feeds the tank.

The invention also provides a system for evaluating the leaktightness of a device for storing high pressure fuel gas used as fuel for vehicles and supplied from a filling station via a filler hose connected to the gas storage device, itself comprising pipework and at least one tank, with at least one check valve disposed between the pipework and the tank, the system comprising a pressure-measuring device suitable for connection to the filler hose or to the pipework, a processor device for processing values measured by the pressure-measuring device, and a display device for displaying information supplied by the processor device, the device for processing values measured by the pressure-measuring device including means for controlling filling and suspending filling of the fuel gas storage device from the filling station, means for controlling the filling flow rate, a clock, and means for comparing the measured pressure relative to predetermined thresholds $S_i$ during periods in which filling is suspended.

According to an advantageous characteristic that makes it possible to perform self-tests for checking the integrity of a filling station and the filler hose, the device for processing values measured by the pressure-measuring device further includes means for controlling the filler hose connected to the filling station when no gas storage device is connected thereto, so as to pressurize it up to a predetermined reference pressure value, for causing said pressurization to be suspended, and for acting selectively, after pressurization has been suspended, either to cause a display that a leak from the filling station is present, or else to repressurize the filler hose up to a new predetermined reference pressure value greater than the preceding predetermined reference pressure value.

According to another advantageous characteristic, the device for processing values measured by the pressure-measuring device further includes means for analyzing the speed of the pressure drop measured by the pressure-measuring device and means for comparing said pressure drop speed relative to a threshold value $S_v$ depending on the respective volumes of the pipework and of the tank.

BRIEF DESCRIPTION OF THE DRAWINGS

Other characteristics and advantages of the invention appear from the following description of particular embodiments, given as examples and with reference to the accompanying drawings, in which.

DETAILED DESCRIPTION OF PARTICULAR EMBODIMENTS

Figure 1:
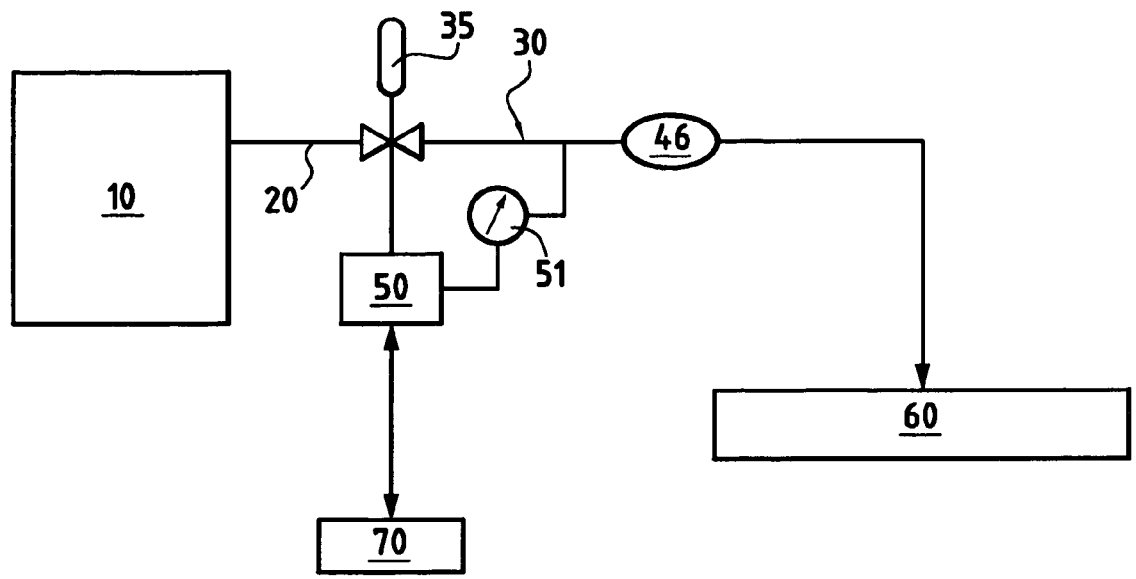
FIG. 1 is a diagrammatic view of the main elements of a leak test system of the invention.

FIG. 1 is a general diagram showing the principle of a leak diagnosis system in accordance with the invention for evaluating the leaktightness of devices (pipework, tanks) for storing a gaseous fuel under high pressure such as compressed natural gas (CNG) which is used in vehicles and is then referred to as natural gas for vehicles (NGV).

Compressed natural gas is available in filling stations 10 having terminals provided with flexible filler hoses 20 to which users can make a connection in order to fill a tank such as 60.

In the invention, one or more tanks 60 such as vehicle tanks, associated with pipework 30 suitable for connection to a filler hose 20, itself connected to a filling station 10, co-operate with a system for diagnosing leaktightness that comprises essentially a pressure gauge 51, processor circuits 50, such as a microcomputer, and a display unit 70 that may form part of the microcomputer or that may constitute a unit that is independent from the processor circuit. A flow meter 46 is advantageously placed on a pipe connected to the tank 60. The pipework 30 includes amongst other things a solenoid valve 35 of variable aperture.

Figure 2:
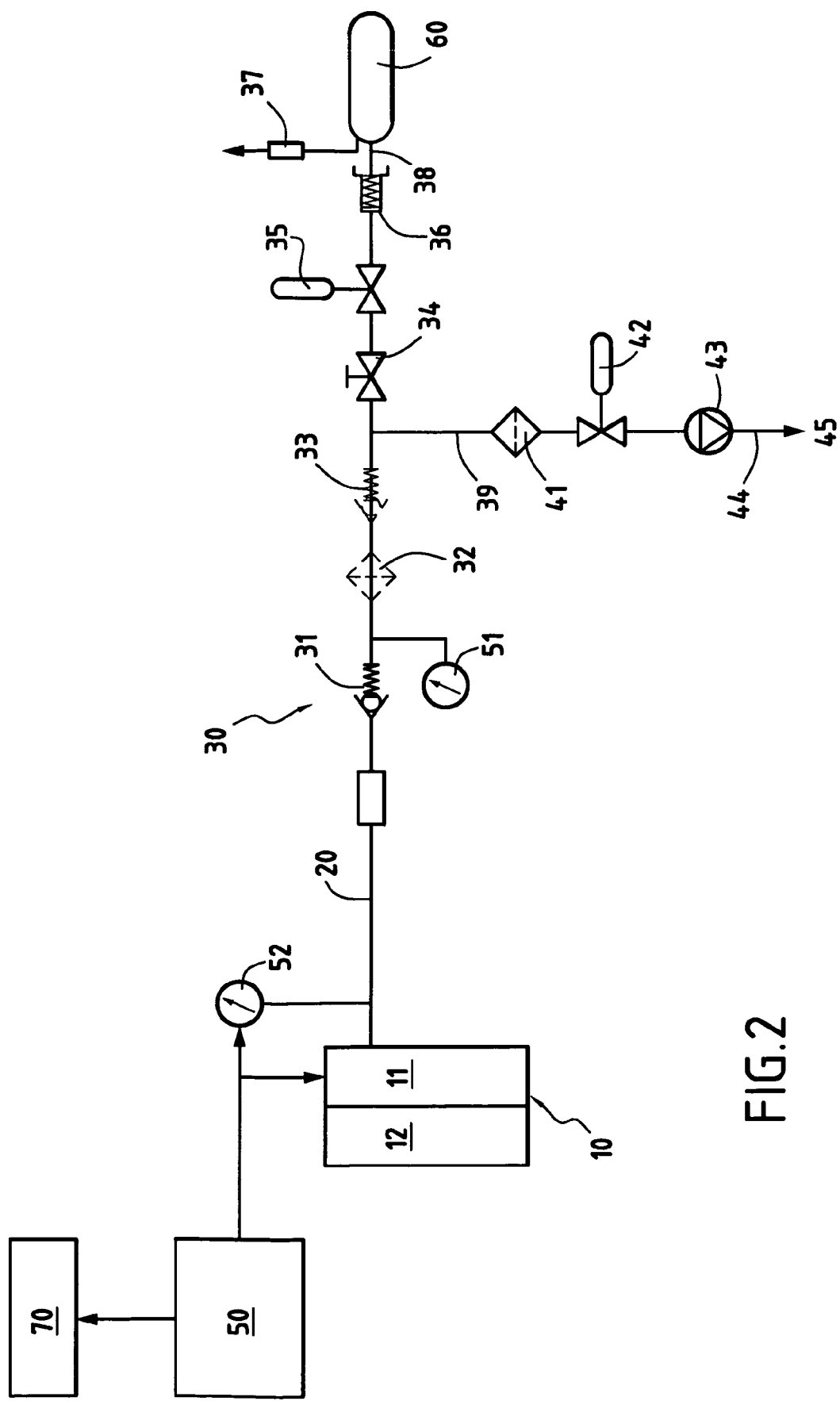
FIG. 2 is a diagram showing an example application of the leak test system of the invention to a particular device for storing gas under high pressure.

FIG. 2 shows the application of the leak test system to a particular device for storing high pressure fuel gas that is placed close to a filling station 10 comprising at least one storage tank 12 or a compressor, and a delivery terminal 11 connected to a flexible hose 20 for high pressure delivery.

A data processor device 50 and a display unit 70 are located in the filling station 10 and receive pressure data supplied by a pressure-measuring device 52 which measures the pressure in the high pressure delivery hose 20, or a pressure-measuring device 51 which measures the pressure in a pipe 38 for connecting a tank 60 to the hose 20.

The tank 60 includes a vent pipe provided with a thermal fuse 37 and, on the feed pipe 38, a polyvalve acting as a check valve when stationary. The polyvalve may comprise a manual valve 34, a solenoid valve 35, and a flow limiter 36. Upstream from the polyvalve the pipe includes an optional check valve 33, an optional CNG T-filter 32 which may be provided with double-ring couplings, and a filler endpiece 31 for coupling to the high pressure delivery hose 20. Upstream from the polyvalve, a rigid or flexible pipe 39 is associated with an in-line CNG filter 41, a solenoid valve 42, and an expander 43, and is extended by a flexible hose 44 for feeding injectors 45 which, in operation, are fed with CNG from the tank 60 when the vehicle fitted with this device leaves the filling station.

Figure 3:
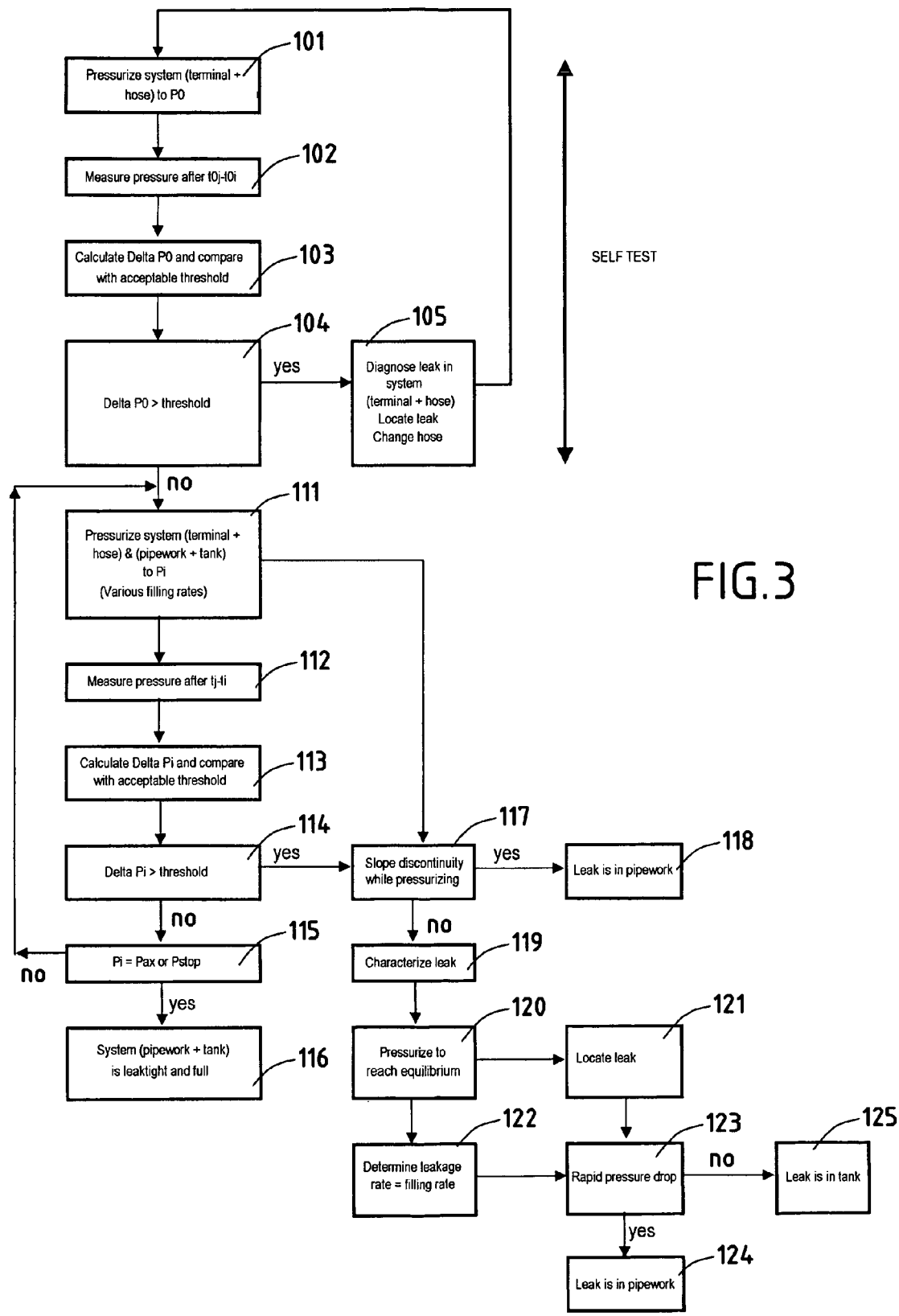
FIG. 3 is a flow chart showing the main steps in the leak test method of the invention.

The functional elements of the leak test system of the invention are described below with reference to the flow chart of FIG. 3 showing the various steps of the method of the invention.

The invention serves firstly to evaluate in general manner the leaktightness of the high pressure portion of a vehicle, comprising one or more tanks and the pipework for connection to the filling station, and secondly, if a leak is detected, to classify the leak in a category depending on its size, and finally to determine whether the leak is from a tank or from the pipework.

A leak, if any, is characterized by its flow rate, which depends on the pressure and on the size of the opening through which the leak occurs.

Leaks can thus be distributed essentially in four categories as a function of leakage rate, expressed in normal cubic meters per hour ($Nm^3/h$), i.e. corresponding to the volume flow rate expressed in cubic meters per hour converted to normalized conditions of temperature (273 kelvins (K)) and of pressure (101.3 kilopascals (kPa)):

a microleak (flow rate less than 0.02 $Nm^3/h$): a leak that can generally be detected only at 1000 bubbles, as can arise when a coupling is poorly tightened (but still using a wrench). A missing gasket in the filler endpiece also comes into this category;

a small leak (rate lying in the range 0.2 $Nm^3/h$ to 3 $Nm^3/h$): this rate is likely to be observed in the event of a leak downstream from the polyvalve, when the polyvalve is closed and if the leaktightness of the gasket is degraded. A shaving on the endpiece gasket also leads to a leak of this category;

a medium leak (rate lying in the range 3 $Nm^3/h$ to 10 $Nm^3/h$): this type of leak is likely to occur if the coupling has been tightened by hand only; and a large leak (flow rate greater than 10 $Nm^3/h$): this type of leak can occur on damaged pipework (possibly through an orifice having an equivalent diameter of 0.5 millimeters (mm)).

The method and the system of the invention for verifying leaktightness are described below with reference to FIG. 3 which shows the main steps of the method.

Steps 101 to 105 correspond to a self-test procedure for the filling station 10 and the hose 20. This self-test procedure is performed when not performing an operation of filling the fuel gas storage device of a vehicle, such that no filler endpiece 31 is connected to the hose 20. A pressure gauge 52 is used to measure the pressure in the hose 20 and is connected to the measurement processor device 50.

The self-test operation may be triggered periodically, manually or automatically, and it can be performed at different operating pressures $P_0$, such as, for example: 10 bar, 100 bar, and 200 bar.

Step 101 of this self-test procedure consists in pressurizing the assembly constituted by the filling station 10 and the hose 20 to a pressure $P_0$ (greater than about 5 bar). When the pressure $P_0$ is reached at an instant $t0_i$, pressurization is suspended but depressurization is not performed, and the variation in the pressure is measured until a second predetermined instant $t0_j$ (step 102). The instantaneous value $P_i$ of the pressure at instant $t0_j$ is compared relative to a predetermined threshold $S0_i$ (step 103). In step 104, a test is performed to determine whether between instants $t0_i$ and $t0_j$, the pressure decreases and drops below the predetermined threshold pressure $S0_i$. If so, then in step 105 the presence of a leak from the assembly comprising the filling station 10 and the hose 20 is diagnosed, and for example the precaution may be taken of changing the hose 20 before an operation of filling a vehicle.

After diagnosis and repair step 105, the method returns to step 101.

If the test in step 104 reveals no leak from the assembly comprising the filling station 10 and the hose 20, then the method moves on to step 111 during which, after connecting the hose 20 to the filler endpiece 31 of a gas storage device 30, 60, the filler hose 20, the pipework 30, and the tank 60 are pressurized from the filling station 10 to a pressure $P_i$ that is greater than at least 5 bar, e.g. a pressure of 7 bar, while filling at a controlled rate $Q_i$ and variation in pressure $P_i$ is measured as a function of time.

During a step 117, an examination is made to see whether there is a discontinuity in the slope for variation in the pressure $P_i$ as a function of time, and if there is a discontinuity, it is deduced that there exists a leak from the pipework 30.

In the event where filling is triggered while there is a leak located in the pipework 30, and given the presence of a polyvalve comprising a manually-controlled valve 34, a solenoid valve 35, and a flow rate limiter 36, which polyvalve acts as a check valve when the vehicle is stationary, and thus during filling, once gas in the pipework 30 has had time to escape between the vehicle stopping and the beginning of filling, there exists at the beginning of filling a pressure difference between the pipework 30 and the tank 60, with this pressure difference being generated by the gas escaping from the pipework.

Once filling is started with a controlled flow rate in step 111, if there is a slope discontinuity between segments C1 and C2 of the curve C plotting pressure as a function of time (FIG. 5), it can be deduced that there is a leak situated in the pipework (step 118). Initially (segment C1), the pipework which is small in volume sees its pressure increase until it reaches the pressure of the tank. Thereafter the pressure rises much more slowly (segment C2) while filling continues at the same rate.

Figure 5:
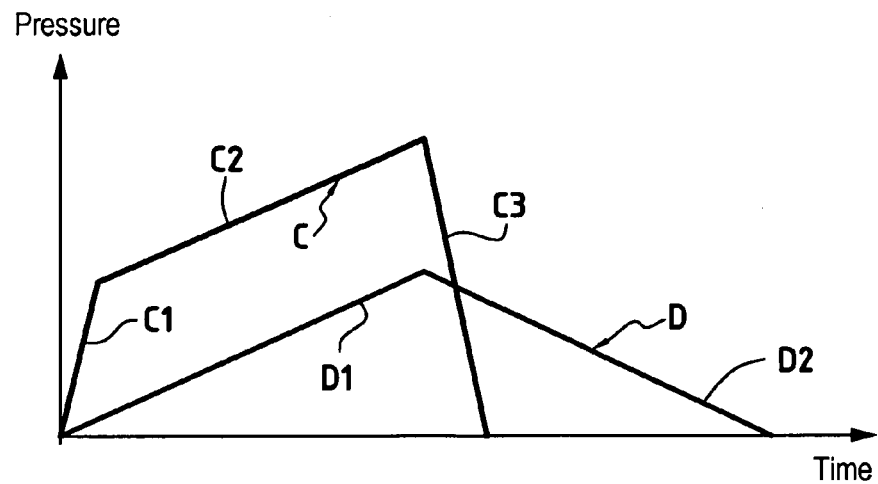
FIG. 5 is a graph showing how pressure varies as a function of time when implementing the method of the invention firstly in the event of a leak from pipework, and secondly in the event of a leak from a tank.

In contrast, if there is a leak from the tank, which presents a volume that is much greater than that of the pipework 30, it is possible that the time lapse between the vehicle stopping and the start of filling has not allowed gas to escape from the pipework sufficiently for it to be possible subsequently to observe a discontinuity in the slope (as applied to segment D1 of curve D in FIG. 5).

Nevertheless, the method of the invention enables a leak to be detected reliably regardless of whether the leak is from the tank or from the pipework.

To do this, in step 112 that follows step 111, the filling operation is suspended without performing any depressurization at a predetermined instant $t_i$ after the beginning of pressurization, and variation in the pressure $P_i$ continues to be measured using the gauge 51 until an instant $t_j$.

In step 113, the measured pressure $P_i$ is compared relative to a predetermined threshold $S_i$.

Figure 4:
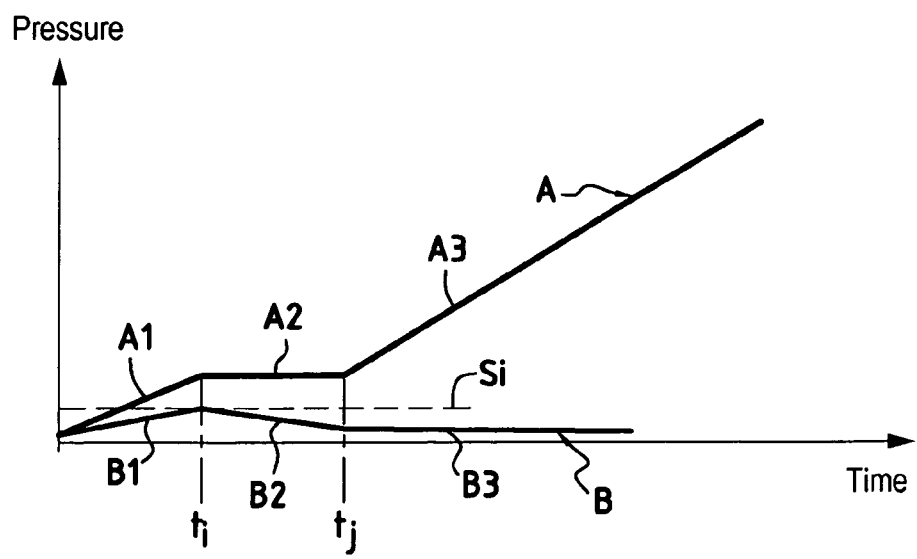
FIG. 4 is a graph showing how pressure varies as a function of time during a particular step of the method of the invention serving to detect whether the gas storage device is leaktight or not.

In step 114, if it is found that between instants $t_i$ and $t_j$ the pressure has decreased and dropped below the predetermined threshold $S_i$ (as applies to segment B2 of curve B in FIG. 4 plotting variation in pressure as a function of time, and comprising successive segments B1, B2 and B3), then the presence of a leak is indicated and the method moves on to step 117 or 119.

In contrast, if it is observed in step 114 that between the first and second predetermined instants $t_i$ and $t_j$, the pressure remains above the predetermined threshold $S_i$ (as applies to segment A2 of curve A in FIG. 4 plotting variations in pressure as a function of time and comprising successive segments A1, A2, A3), then the filling operation is restarted with a pressure $P_{ax}$ (step 115) and subsequently, including at the normal end of the filling operation at the pressure $P_{stop}$, the variation in the pressure relative to predetermined thresholds is verified during a predetermined duration after each suspension of the filling operation so that on each occasion it is possible to detect a leak, of any (steps 111 to 115).

If at the end of step 115 that has already reached the stop pressure $P_{stop}$, no leak is detected, then, in a step 116, it is indicated that the storage device comprising the pipework 30 and the tank 60 is leaktight and full.

After a step 114 or 117 that has led to a leak being detected, the method moves on to a step 119 for determining the size of the leak.

To do this, in a step 120, pressure is raised again while adjusting flow rate so as to obtain a balance between the leakage rate and the filling rate. By filling again at a controlled rate, the pressure is raised up to a threshold pressure. This pressure and the filling rate that balances the leakage rate characterize the leak (step 122) which can then be classed as being a microleak, a small leak, a medium leak, or a large leak.

Thus, if regardless of the regulated flow rate imposed by the diagnosis system, the pressure does not stabilize and continues to increase, then the leak is classified as being in the microleak category. At the other extreme, if regardless of the flow rate the pressure does not increase, then the leak is classified in the large leak category.

Figure 6:
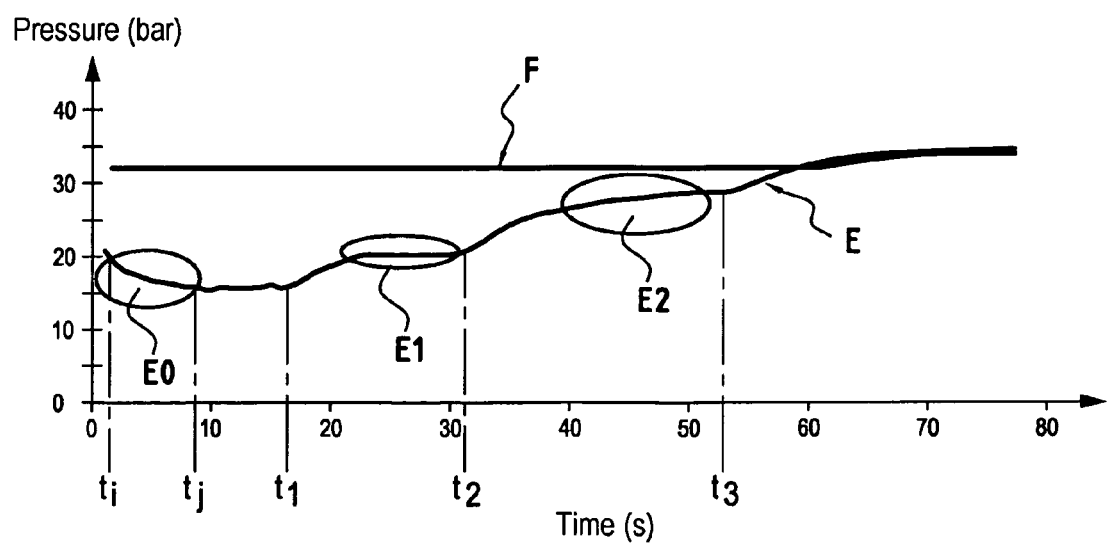
FIG. 6 is a graph showing how pressure varies as a function of time in pipework and in a tank during a particular step in the method of the invention in which the filling rate is subjected to controlled increases.

FIG. 6 shows curves E and F plotting variation in pressure as a function of time respectively for the pressure in the pipework 30 and for the pressure in the tank 60, in the presence of a leak and while applying various controlled filling rates.

Filling rate is increased at successive instants $t_1$, $t_2$, and $t_3$. Pauses such as $E_1$ and $E_2$ can be seen to be present after each increase in the filling rate. The changes in the shape of the curves when a leak is present serves to characterize the size of the leak, as mentioned above.

More particularly, the procedure that can be adopted for determining the size of a leak detected while filling pipework 30 and the corresponding tank 60 is nevertheless described in greater detail below with reference to FIG. 6.

As explained above, at the beginning of filling, the system is pressurized at a controlled flow rate $Q_i$ that is low (step 111 in FIG. 4). If the system is not leaktight when measuring pressure at successive instants $t_i$ and $t_j$, then between those successive instants $t_i$ and $t_j$ a decrease is observed in the pressure measured by the gauge 51 or 52 (zone $E_0$ of curve E in FIG. 6), since the filling rate, which initially is small, is less than the leakage rate.

In order to determine the leakage rate, with a given value of pressure in the tank 60 as represented by curve F in FIG. 6, after the initial step of filling with an initial control flow rate $Q_i$, a delivery valve (e.g. the solenoid valve 35) continues to be opened progressively in steps at instants $t_1$, $t_2$, and $t_3$, . . . , thus enabling the pipework 30 and the tank 60 to be filled. Each position of the delivery valve is calibrated or monitored by a flow meter 46 (FIG. 1). On each increase in the filling rate, variation of the pressure in the pipework 30 is measured until a horizontal pause of stabilized pressure is observed as shown in zone $E_1$ of curve E in FIG. 6, between instants $t_1$ and $t_2$, corresponding to successive increases in the controlled flow rate. At no moment during this process is the filling rate reduced to zero.

The horizontal stabilized pressure pause in zone $E_1$ corresponds to the fact that the filling rate exactly balances the leakage rate. If the filling rate is increased again at instant $E_2$, it can then be seen in the zone $E_2$ of the curve E in FIG. 6 pauses while increasing slightly which means that there has been a slight increase in pressure because the filling rate has become greater than the leakage rate.

At the end of this process (steps 119, 120, 122 of FIG. 3), the leak which is classified as belonging to the small or medium leak category can thus be fully categorized in terms of the filling flow rate value that leads to a horizontal pause in pressure (zone $E_1$), and by the value of the pressure at said horizontal pause.

In the extreme circumstance where after two successive adjustments of increasing the controlled filling rate it has not been possible to observe a stabilized horizontal pressure pause followed by a sloping pause of increasing pressure, it is nevertheless possible to classify the leak as follows amongst the extreme categories:

If, whatever the value of the filling rate imposed by the diagnosis system at successive instants such as $t_1$ and $t_2$, no pressure stabilization is observed with a horizontal pause as in the zone $E_1$, but only upwardly sloping pauses as in the zone $E_2$, then the leak should be classified as belonging to the category of microleaks.

In contrast, if regardless of the values of the filling flow rate imposed by the diagnosis system at the successive instants such as $t_1$ and $t_2$, no rising pause is obtained as in the zone $E_2$, then the leak should be classified as belonging to the category of very large leaks.

Steps 121 to 125 serve to locate the leak as being either from the pipework or from the tank.

The distinction between a leak from the pipework 30 and a leak from the tank 60 can be drawn because of the large difference between their respective volumes (the ratio between these volumes is generally greater than 50) and because they are isolated from each other by a polyvalve that acts as a check valve when the vehicle is stopped, and thus during the filling operation.

Once the size of the leak has been determined in step 122, the rate at which pressure drops is verified in step 123. If in step 123 it is found that pressure drops rapidly (segment C3 of curve C in FIG. 5), then it is deduced that the leak is situated in the pipework or at the connection with the filler system (step 124). Otherwise, if in step 123 it is found that pressure drops slowly (segment D2 of curve D in FIG. 5), then it is deduced that the leak is situated from the tank (step 125).

In general, the measured value dP/dt for the variation in pressure as a function of time at constant temperature T is proportional to the instantaneous leakage rate $Q_i$ which is a function of the pressure and of the size of the leak, and to the escaping volume V, which can be expressed by the following equation:

$$\frac{dp}{dt} = \frac{RT}{V} Q_i$$

where R is the perfect gas constant.

The method of the invention with the various steps described above can be implemented over the entire range of pressure values which, from the beginning of filling to the end of filling may extend from 7 bar to 200 bar, for example.

What is claimed is:

1. A method of evaluating the leaktightness of a device for storing fuel gas under high pressure for use as fuel by vehicles and delivered from a filling station via a filler hose that is connected to the gas storage device, itself comprising pipework and at least one tank, the method comprising the following steps:

a) while filling the fuel gas storage device from the filling station, pressurizing the filler hose, the pipework, and said tank from the filling station at a pressure that is greater than at least 5 bar, filling at a controlled filling flow rate $Q_i$, and measuring variation in pressure $P_i$; and b) at a first predetermined instant $t_i$ after the start of pressurizing, suspending the filling operation without depressurizing, continuing to measure variation in pressure $P_i$, to a second predetermined instant $t_j$, comparing the pressure $P_i$ relative to a predetermined threshold $S_i$, and if, between the first and second predetermined instants $t_i$, $t_j$, the pressure decreases and drops below the predetermined threshold $S_i$, informing that a leak is present, whereas if, between the first and second predetermined instants $t_i$, $t_j$ the pressure remains above the predetermined threshold $S_i$, restarting the filling operation and, at subsequent instants, including at the normal end of the filling operation, repeating verifications of variation in pressure relative to predetermined thresholds during a predetermined duration after each suspension of the filling operation so as to detect, on each occasion, the presence of a leak, if any, wherein, prior to connecting the fuel storage device to the filler hose of the filling station, the method further comprises:

pressurizing the filler hose up to a predetermined pressure greater than or equal to 5 bar, suspending pressurization at an instant $t0_i$ when the predetermined pressure is reached, but without depressurizing, measuring variation in pressure until a second predetermined instant $t0_j$, comparing the instantaneous value $P_i$ of the pressure relative to a predetermined threshold $S0_i$, and, if, between the first and second predetermined instants $t0_i$ and $t0_j$, the pressure decreases and drops below the predetermined threshold $S0_i$, then informing that the filling station or the filler hose presents a leak, whereas if, between the first and second predetermined instants $t0_i$, $t0_j$ the pressure remains above the predetermined threshold $S0_i$, then repeating the operation of pressurizing the filler hose up to a predetermined pressure greater than the previously-reached pressure, and repeating the operation of suspending pressurization and measuring pressure variation relative to a predetermined threshold during a predetermined duration in order again to detect the presence of a leak, if any, with new operations of pressurization and suspension while monitoring pressure variation being performed until reaching a maximum operating pressure of the filling station.

2. A method according to claim 1, wherein during the first step of filling the fuel gas storage device from the filling station at a controlled filling rate $Q_i$, variation in the pressure $P_i$ is measured as a function of time, and if a slope discontinuity is detected, it is deduced that a leak exists from the pipework.

3. A method according to claim 1, wherein, in the event of a leak from the fuel gas storage device being detected, the filling operation is repeated with the controlled filling flow rate being adjusted by successive increments, while continuing to monitor variation in pressure, and if, after two successive increases in the controlled filling flow rate there is detected firstly a horizontal pause at stabilized pressure and secondly a sloping pause of increasing pressure, then the leak is categorized as being a small or medium leak, and the leakage rate is determined from the controlled filling rate that led to said horizontal pause at stabilized pressure.

4. A method according to claim 1, wherein, in the event of a leak from the fuel gas storage device being detected, the filling operation is repeated with the controlled filling flow rate being adjusted by successive increments, while continuing to monitor variation in pressure, and if, regardless of the value of the filling rate, it is observed that the pressure does not stabilize and always increases, the leak is classified in the microleak category.

5. A method according to claim 1, wherein, in the event of a leak from the fuel gas storage device being detected, the filling operation is repeated with the controlled filling flow rate being adjusted by successive increments, while continuing to monitor variation in pressure, and if, regardless of the value of the filling rate, it is found that the pressure does not increase, the leak is classified in the category of very large leaks.

6. A method according to claim 3, wherein in the event of a leak being detected from the fuel gas storage device, after identifying the category specifying the size of the leak, and verifying the presence of a check valve between the pipework and the tank, the speed at which pressure drops is analyzed and compared relative to a threshold value $S_v$, depending on the respective volumes of the pipework and of the tank, and the leak is identified as being either from the pipework if the pressure drop speed is greater than the threshold value $S_v$, or as being from the tank if the pressure drop speed is less than the threshold value $S_v$.

7. A method according to claim 1 applied to leak testing storage devices for natural gas used as fuel for vehicles.

8. A system for evaluating the leaktightness of a device for storing high pressure fuel gas used as fuel for vehicles and supplied from a filling station via a filler hose connected to the gas storage device itself comprising pipework and at least one tank, with at least one check valve disposed between the pipework and the tank, the system comprising a pressure-measuring device suitable for connection to the filler hose or to the pipework, a processor device for processing values measured by the pressure-measuring device, and a display device for displaying information supplied by the processor device, the device for processing values measured by the pressure-measuring device including means for controlling filling and suspending filling of the fuel gas storage device from the filling station, means for controlling the filling flow rate, a clock, and means for comparing the measured pressure relative to predetermined thresholds $S_i$ during periods in which filling is suspended, wherein the device for processing values measured by the pressure-measuring device further includes means for controlling the filler hose connected to the filling station when no gas storage device is connected thereto, so as to pressurize it up to a predetermined reference pressure value, for causing said pressurization to be suspended, and for acting selectively, after pressurization has been suspended, either to cause the display that a leak from the filling station is present, or else repressurize the filler hose up to a new predetermined reference pressure value greater than the preceding predetermined reference pressure value.

9. A system according to claim 8, wherein the device for processing values measured by the pressure-measuring device further includes means for analyzing the speed of the pressure drop measured by the pressure-measuring device and means for comparing said pressure drop speed relative to a threshold value $S_v$ depending on the respective volumes of the pipework and of the tank.

10. A system according to claim 8 applied to leak testing devices for storing natural gas used as fuel for vehicles.

11. A method of evaluating the leaktightness of a device for storing fuel gas under high pressure for use as fuel by vehicles and delivered from a filling station via a filler hose that is connected to the gas storage device, itself comprising pipework and at least one tank, the method comprising the following steps:
a) while filling the fuel gas storage device from the filling station, pressurizing the filler hose, the pipework, and said tank from the filling station at a pressure that is greater than at least 5 bar, filling at a controlled filling flow rate $Q_i$, and measuring variation in pressure $P_i$; and
b) at a first predetermined instant $t_i$ after the start of pressurizing, suspending the filling operation without depressurizing, continuing to measure variation in pressure $P_i$ to a second predetermined instant $t_j$, comparing the pressure $P_i$ relative to a predetermined threshold $S_i$, and if between the first and second predetermined instants $t_i$, $t_j$ the pressure decreases and drops below the predetermined threshold $S_i$, informing that a leak is present, whereas if between the first and second predetermined instants $t_i$, $t_j$ the pressure remains above the predetermined threshold $S_i$, restarting the filling operation and, at subsequent instants, including at the normal end of the filling operation, repeating verifications of variation in pressure relative to predetermined thresholds during a predetermined duration after each suspension of the filling operation so as to detect, on each occasion, the presence of a leak, if any,
wherein, in the event of a leak from the fuel gas storage device being detected, the filling operation is repeated with the controlled filling flow rate being adjusted by successive increments, while continuing to monitor variation in pressure, and if, after two successive increases in the controlled filling flow rate there is detected firstly a horizontal pause at stabilized pressure and secondly a sloping pause of increasing pressure, then the leak is categorized as being a small or medium leak, and the leakage rate is determined from the controlled filling rate that led to said horizontal pause at stabilized pressure.

12. A method of evaluating the leaktightness of a device for storing fuel gas under high pressure for use as fuel by vehicles and delivered from a filling station via a filler hose that is connected to the gas storage device, itself comprising pipework and at least one tank, the method comprising the following steps:
a) while filling the fuel gas storage device from the filling station, pressurizing the filler hose, the pipework, and said tank from the filling station at a pressure that is greater than at least 5 bar, filling at a controlled filling flow rate $Q_i$, and measuring variation in pressure $P_i$; and
b) at a first predetermined instant $t_i$ after the start of pressurizing, suspending the filling operation without depressurizing, continuing to measure variation in pressure $P_i$ to a second predetermined instant $t_j$, comparing the pressure $P_i$ relative to a predetermined threshold $S_i$, and if between the first and second predetermined instants $t_i$, $t_j$ the pressure decreases and drops below the predetermined threshold $S_i$, informing that a leak is present, whereas if between the first and second predetermined instants $t_i$, $t_j$ the pressure remains above the predetermined threshold $S_i$, restarting the filling operation and, at subsequent instants, including at the normal end of the filling operation, repeating verifications of variation in pressure relative to predetermined thresholds during a predetermined duration after each suspension of the filling operation so as to detect, on each occasion, the presence of a leak, if any,
wherein, in the event of a leak from the fuel gas storage device being detected, the filling operation is repeated with the controlled filling flow rate being adjusted by successive increments, while continuing to monitor variation in pressure, and if, regardless of the value of the filling rate, it is observed that the pressure does not stabilize and always increases, the leak is classified in the microleak category.

13. A method of evaluating the leaktightness of a device for storing fuel gas under high pressure for use as fuel by vehicles and delivered from a filling station via a filler hose that is connected to the gas storage device, itself comprising pipework and at least one tank, the method comprising the following steps:
a) while filling the fuel gas storage device from the filling station, pressurizing the filler hose, the pipework, and said tank from the filling station at a pressure that is greater than at least 5 bar, filling at a controlled filling flow rate $Q_i$ and measuring variation in pressure $P_i$; and
b) at a first predetermined instant $t_i$ after the start of pressurizing, suspending the filling operation without depressurizing, continuing to measure variation in pressure $P_i$ to a second predetermined instant $t_j$, comparing the pressure $P_i$ relative to a predetermined threshold $S_i$, and if between the first and second predetermined instants $t_i$, $t_j$ the pressure decreases and drops below the predetermined threshold $S_i$ informing that a leak is present, whereas if between the first and second predetermined instants $t_i$, $t_j$ the pressure remains above the predetermined threshold $S_i$, restarting the filling operation and, at subsequent instants, including at the normal end of the filling operation, repeating verifications of variation in pressure relative to predetermined thresholds during a predetermined duration after each suspension of the filling operation so as to detect, on each occasion, the presence of a leak, if any,
wherein, in the event of a leak from the fuel gas storage device being detected, the filling operation is repeated with the controlled filling flow rate being adjusted by successive increments, while continuing to monitor variation in pressure, and if, regardless of the value of the filling rate, it is found that the pressure does not increase, the leak is classified in the category of very large leaks.

14. A system for evaluating the leaktightness of a device for storing high pressure fuel gas used as fuel for vehicles and supplied from a filling station via a filler hose connected to the gas storage device itself comprising pipework and at least one tank, with at least one check valve disposed between the pipework and the tank, the system comprising a pressure-measuring device suitable for connection to the filler hose or to the pipework, a processor device for processing values measured by the pressure-measuring device, and a display device for displaying information supplied by the processor device, the device for processing values measured by the pressure-measuring device including means for controlling filling and suspending filling of the fuel gas storage device from the filling station, means for controlling the filling flow rate, a clock, and means for comparing the measured pressure relative to predetermined thresholds $S_i$ during periods in which filling is suspended, wherein the device for processing values measured by the pressure-measuring device further includes means for analyzing the speed of the pressure drop measured by the pressure-measuring device and means for comparing said pressure drop speed relative to a threshold value $S_v$ depending on the respective volumes of the pipework and of the tank.

* * * * *